Aug. 27, 1968    A. J. F. M. VAN HOOF    3,398,768
WIRE STRAIGHTENING APPARATUS
Filed July 20, 1966    4 Sheets-Sheet 1
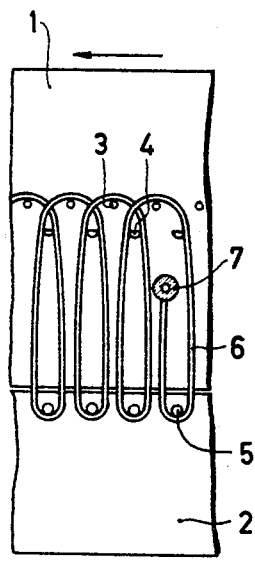
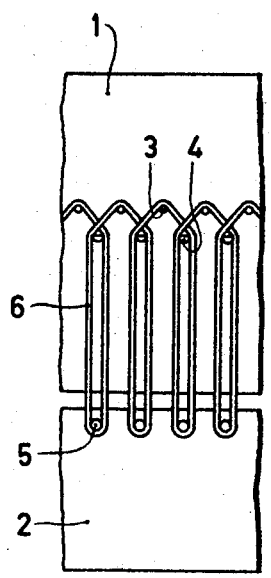
FIG.1    FIG.2    FIG.3
INVENTOR.
ALBERTUS J.F.M. VAN HOOF
BY
*Frank R ...*
AGENT Aug. 27, 1968   A. J. F. M. VAN HOOF   3,398,768
WIRE STRAIGHTENING APPARATUS
Filed July 20, 1966   4 Sheets-Sheet 2

INVENTOR.
ALBERTUS J.F.M. VAN HOOF
BY
Frank R Trifari
AGENT

Aug. 27, 1968     A. J. F. M. VAN HOOF     3,398,768
WIRE STRAIGHTENING APPARATUS

Filed July 20, 1966                                                    4 Sheets-Sheet 3

INVENTOR.
ALBERTUS J.F.M.VAN HOOF
BY
Frank R Infani
AGENT

INVENTOR.
ALBERTUS J.F.M. VAN HOOF

United States Patent Office 3,398,768
Patented Aug. 27, 1968

3,398,768
WIRE STRAIGHTENING APPARATUS
Albertus Judocus Franciscus Maria Van Hoof, Eindhoven, Netherlands, assignor to North American Philips Company, Inc., New York, N.Y., a corporation of Delaware
Filed July 20, 1966, Ser. No. 566,572
Claims priority, application Netherlands, Aug. 5, 1965, 6510161
5 Claims. (Cl. 140—147)

ABSTRACT OF THE DISCLOSURE

Apparatus for straightening lengths of wire comprising two drums of equal diameter arranged one adjacent the other with their axes offset relative to each other so that the spacing between the confronting edges of the drum is progressively increased. Each drum is provided with a plurality of pins regularly distributed over the peripheral surfaces of the drum and wire guide means are provided for continuously feeding wire to coacting pins of the drum. By rotating both drums at the same speed in the same direction, the distance between coacting pins progressively increases thereby straightening the wire held between the pins.

---

This invention relates to apparatus for straightening lengths of wire, such as lead wire for electrical component parts, such as capacitors.

In mass production of electric or electronic components, it is often necessary for wire having an accurately desired shape to be supplied to production machines in predetermined arrangement. In the manufacture of electrical component parts, such as capacitors, it is desirable, for example that the current supply wires supplied to the capacitor body be completely straight in order to permit mechanical fastening without the occurrence of loss. To obtain straight wires, it is possible for a long wire to be cut into pieces of suitable length which are subsequently straightened by exerting a stretching force on the two ends of each length of wire. However, such a method hardly lends itself to high production mechanization.

An object of the invention, therefore is to provide apparatus which continuously forms a supply wire into a chain comprising a plurality of turns in each of which parts of wire are completely straight. Briefly described, the apparatus according to the invention comprises two rotary drums of substantially equal external diameters which are provided on their peripheral surfaces with regularly distibuted pin-shaped projections which extend from drums in substantially radial direction. The two drums rotate at substantially the same angular speed, and a wire guide is provided which describes a path, with the aid of a control mechanism, such that when the drums are rotating a supply of wire is wound around coacting projections of the two drums. As the drums rotate, the distance between coacting pins of the two drums progressively increases from the position at which wire is supplied to the drums then progressively decreases again for releasing the straightened wire.

In order that the invention may be readily carried into effect, one embodiment thereof will now be described in detail, by way of example, with reference to the accompanying diagrammatic drawings. The device according to this embodiment is suitable inter alia for use in the manufacture of electrical capacitors, of the kind comprising a thin plate of dielectric covered on each side with a thin metal layer to which a connecting wire is attached. By means of the device according to the invention, the connecting wires are straightened and arranged side by side at the desired distance, ready for supply to the capacitor plates.

FIG. 1 shows fragments of two drums provided with pins around which the wire is wound.

FIG. 2 shows the movement of the wire guide during the winding process.

FIG. 3 shows the positions of the drums at which the wire on the pins is straightened.

Figure 4:
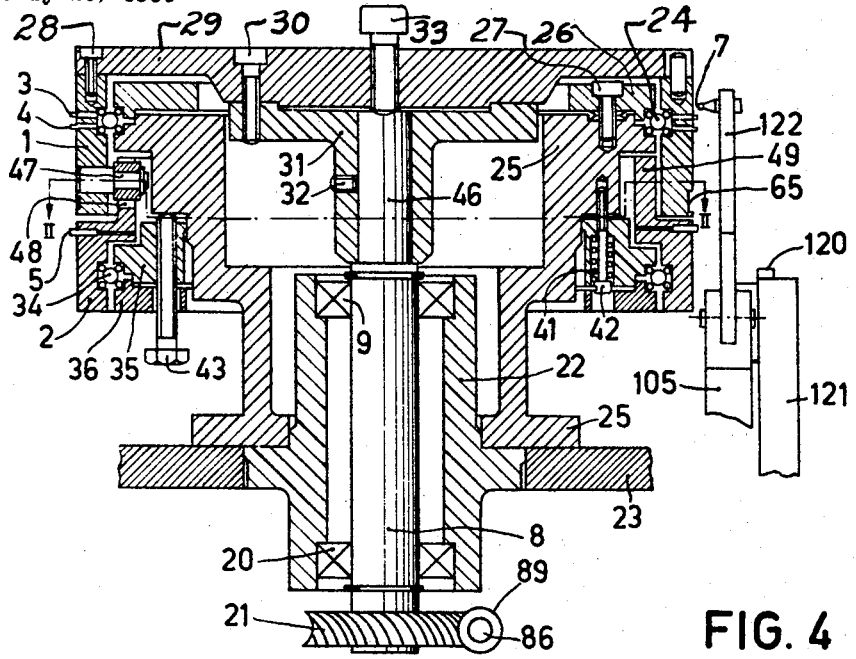
FIG. 4 is a sectional view of a device for straightening the wire.

Referring now to FIG. 1, this figure shows a part of the outer sides of two drums 1 and 2 of equal diameters, the peripheries of drums 1 and 2 being substantially co-planar since the center lines of the two drums are at an angle of only a few degrees to each other.

The drum 1 carries two series of circumferentially extending pins 3 and 4 and the drum 2 carries a similarly extending series of pins 5. All of the pins are arranged on the circumference of the drums with equal spacing and project outwardly at right angles to the peripheral surfaces of the drums.

The pins 3 and 5 have a circular cross-section while the cross section of the pins 4 is semicircular and have edges which are rounded slightly.

The wire 6 is wound around the pins in the manner shown in FIGS. 1 and 2 by the movement of a wire guide 7, the path of which is shown in FIG. 2 and that of the drums, indicated by an arrow (FIG. 1), said two movements being synchronized.

The wire 6 is straightened when the two drums 1 and 2 moving away from each other, resulting in a shape of the wire 6 as shown in FIG. 3. This movement of the drums away from one another results from the rotation of the drums about their axes which are at a small angle to one another.

Figure 5:
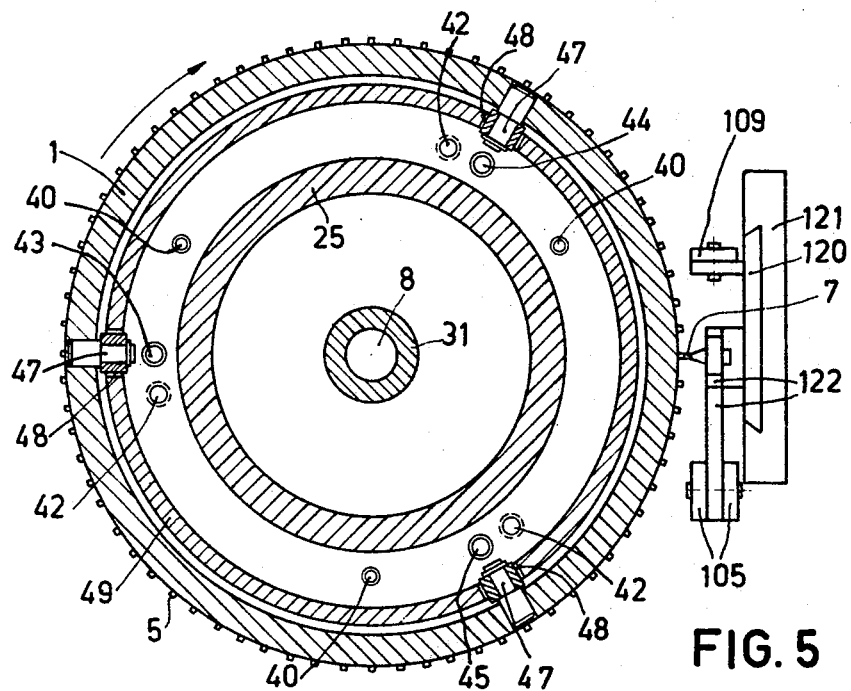
FIG. 5 is a sectional view taken on the line V—V of FIG. 4.

FIGS. 4 and 5 show the manner in which the drums 1 and 2 are driven and guided. A driving shaft 8 for the drums is supported by two ball bearings 9 and 20 and driven by means of a worm wheel 21. The ball bearings are enclosed in a casing 22 connected to a frame 23. The upper drum 1 is guided by a ring of ball bearings 24. The bearing 24 receives the forces exerted by the wire 6 on the pins 3 and 4. The bearing 24 is positioned between an inner configured casing member 25 connected to the frame 23 and an associated ring 26 connected to the casing 25 by screws 27 one of which is shown in FIG. 4, and a depending skirt of drum 1 from which the pins 3, 4 project.

The shaft 8 carries a hub 31 provided with a locking screw 32. The hub 31 has an upper plate 29 connected to it by screws 30 one of which is shown in the figure. The upper plate 29 is secured to the skirt of drum 1 by means of screws 28.

The lower drum 2 is supported by a bearing 34 which is identical with the bearing 24 and arranged between an annular body 35 and a disc 36 which is secured to ring 35 by means of screws 40 (FIG. 5) similar to screws 27. The ring 35 is held against the casing 25 by means of springs 41. The springs 41 are supported by heads of screws 42. One screw is shown in the cross-section of FIG. 4, for the sake of clarity but is actually present in another section, as may be seen from FIG. 5. Three set screws 43, 44 and 45 pass through the ring 35. The ends of these set screws engage an abutment surface of casing 25. When the ends of the three set screws 43, 44 and 45 project from ring 35 through the same distance, the ring 35 and hence the drum 2 are coaxial with the drum 1. The left side of drum 2 as seen in FIGS. 4 and 5 is tilted or moved a small distance away from the drum 1 by turning the screw 43. The position of the screws 44 and 45 (FIG. 5) remain unchanged so that the ring 35 pivots a few degrees about a straight line extending between the points of support, i.e. the two last-mentioned screws.

The center line of ring 35 which coincides with the center line of drum 2 and which initially also coincides with the center line of drum 1 is moved by screw 43, in the plane of FIG. 4, to a position intersecting the center line of drum 1 at points 46. The bearing 34, which constitutes a guide for the drum 2, now also assumes an inclined position relative to the bearing 24 which guides the drum.

The drum 2 is driven at substantially the same speed as the drum 1. This drive takes place by means of three pins 47 (FIG. 5) secured in the wall of drum 1 and extending into three slot-shaped recesses 48 provided in an annular projection 49 which is integral with the drum 2.

Figure 6:
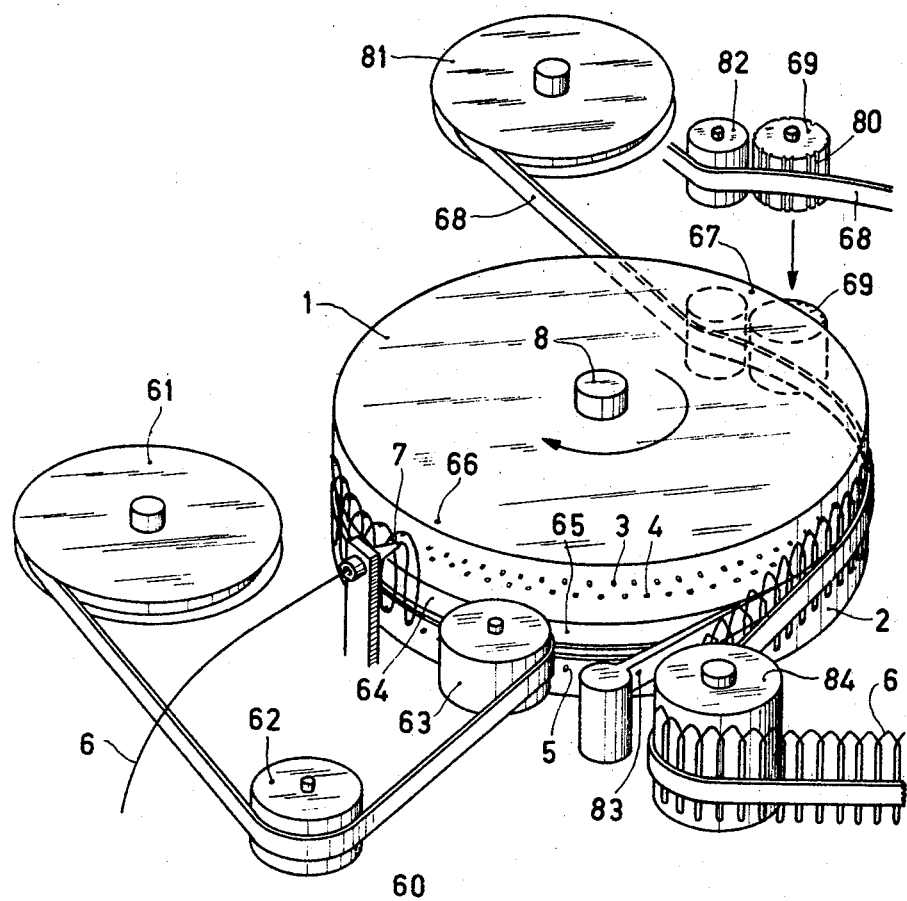
FIG. 6 is a perspective view of the processes of winding and straightening the wire and FIG. 7 is a perspective view of the members for controlling the wire guide.

FIG. 6 shows the two drums 1 and 2 on which the wire 6 has been wound and straightened, and the straightened parts of the wire being removed in pre-selected arrangement. A ribbon 60 of synthetic material is supplied from a spool 61 and guided through rollers 62 and 63 into a groove 65 provided in the outer surface of drum 1. The groove 65 may also be seen in FIG. 4 but is omitted in FIGS. 1 and 3 for the sake of clarity. The ribbon 60 is provided with adhesive on its side remote from the drum 1. The wire 6 is wound round the pins 3, 4 and 5 by the wire guide 7 and adheres to the surface of ribbon 60 provided with adhesive. The wire 6 is progressively straightened between the pins 3, 4 and 5, as has already been described with reference to FIGS. 1 and 3. Due to the rotation of the drums 1 and 2, the center lines of which are at a small angle to one another, the pins move away from one another from a point 66 at which the wire is wound around the pins, and the distance between the pins is a minimum, to a point 67, which is located diametrically opposite points 66 at which the distance between the pins is a maximum. After point 67 has been passed, the tension in the wire progressively decreases until it completely disappears. However, since the elasticity limit of the material of the wire has been exceeded, during straightening, the shape given to the wire remains unchanged. A paper ribbon 68 originating from a spool 81 and guided by a roller 82 is pushed on the wire 6 by means of a roller 69 approximately at point 67. Said roller has grooves 80 into which the straight parts of wire 6 can fall so that the ribbon 68 is pushed against the side of the synthetic ribbon 60 which is provided with adhesive. The wire 6 is thus securely enclosed between the ribbons 60 and 68.

The assembly comprising wire 6 and the two ribbons 60 and 68 is removed from the drum 1 by means of a knife-shaped body 83 having an edge which lies in the groove 65 of drum 1. The assembly is subsequently guided via a roller 84 to machines for manufacturing capacitors and in which the upper side of the wire is cut. When the two straight parts of wire are secured to a capacitor body then the lower connection between the straight parts of wire is cut.

Figure 7:
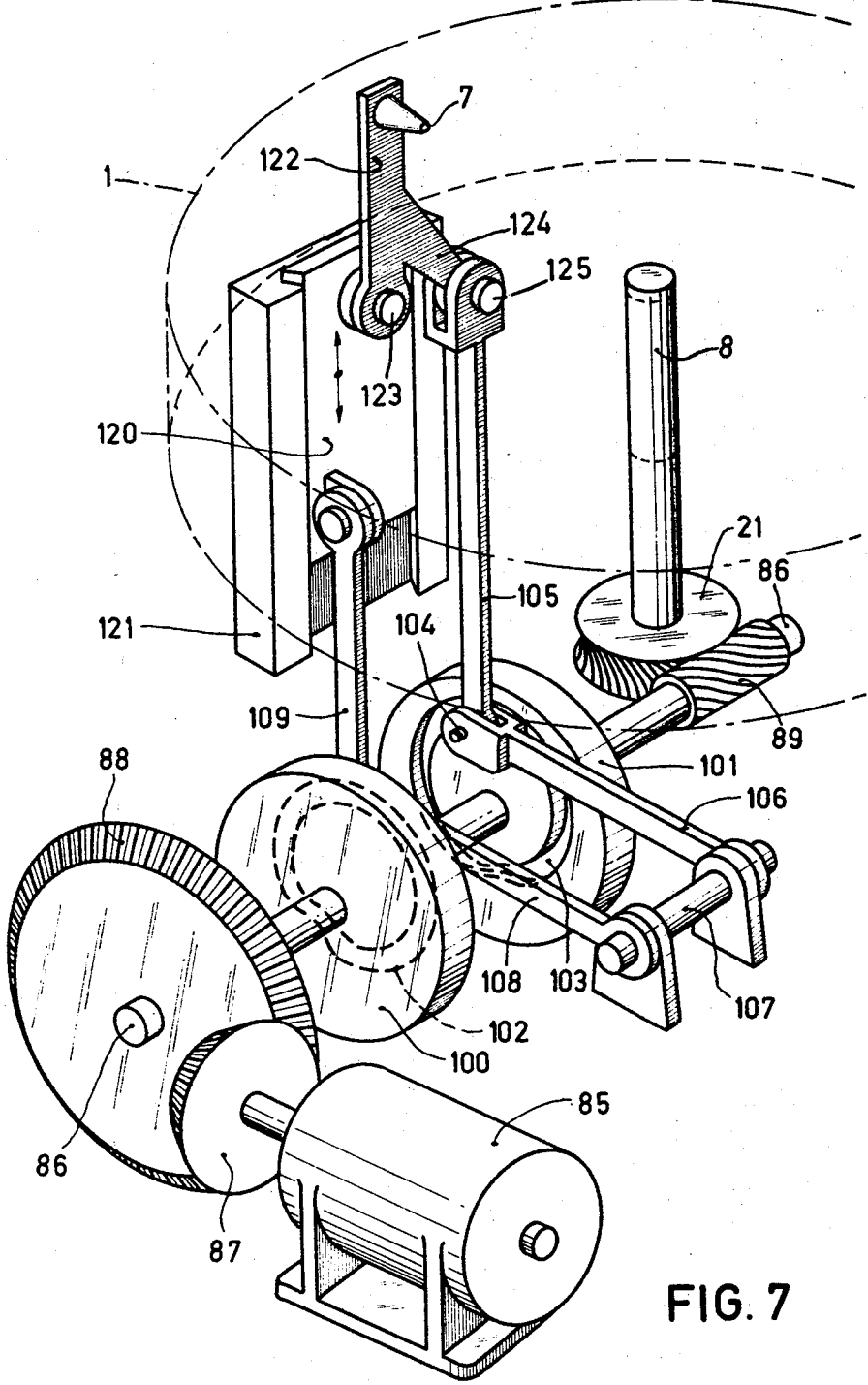

FIG. 7 shows the control mechanism for the wire guide 7. The wire 6 (FIG. 6) is supplied through a hollow nozzle 7 of the wire guide. The movement of the nozzle 7 must take place in synchronism with the rotation of drums 1 and 2. To this end, only one electric motor 85 is used which drives a shaft 86 by means of gears 87 and 88. The shaft 86 drives the shaft 8 of the drums by means of a worm 89 and a wormwheel 21 as explained above so that the rotational speed of shaft 8 is much lower than that of the shaft 86. Two cam discs 100 and 101 having grooves 102 and 103 rotate with the shaft 86. A pin 104 extending into groove 103 constitutes a pivotal connection between a rod 105 and an arm 106. The arm 106 can rotate about a fixed shaft 107 and causes a substantially rectilinear reciprocating movement of the rod 105 upon rotation of cam disc 101. The speed variations of this movement is determined by the shape of groove 103. An arm 108 is also rotatably connected at one end to shaft 107 and secured at its other end to a rod 109 by means of a pin (not shown) one end of which extends into groove 102. The rod 109 also performs a periodical, substantially rectilinear reciprocal movement. The rod 109 controls the reciprocal movement of a slide 120 which is slideable in a holder 121 which is provided with dovetail-shaped guide. A support 122 is pivotally secured on slide 120 by a shaft 123. The support 122 carries the nozzle 7 of the wire guide. An arm 124 of the support 122 is pivotally connected through a shaft 125 to the rod 105. It will be seen, that with this arrangement the wire guide or nozzle 7 will describe a path which depends upon the movements performed by the pivot shafts 123 and 125 connected to the wire guide support 122 which movement is in turn derived from the shape of the cam disc grooves 102, 103. Movement of the pivot shaft 123 is a rectilinear one and is derived from rod 109 and the cam groove 102. The pivot shaft 125 describes a curved path as seen in FIG. 2. The instantaneous position of the wire guide 7 thus depends upon the mutual position of the rods 105 and 109. The cam grooves 102 and 103, which control the rods 105 and 109, must therefore be shaped to ensure that nozzle 7 performs the winding movement of wire 6 as shown in FIG. 2.

The apparatus illustrated has been found to be very suitable for straightening short wires which serve as connecting members for capacitors. Notably the possibility of adjusting the position of drum 2 relative to drum 1 affords significant advantages.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and desired to be secured by Letters Patent of the United States is:

1. Apparatus for producing straightening lengths of wire comprising a first and second drum member, said drum members having substantially equal diameters, a plurality of pins projecting radially from each said drum member and regularly distributed over the circumferential surfaces thereof, wire guide means for continuously feeding wire to coacting pins of each said drum, said wire being placed on said pins by said wire guide means for forming a loop on said coacting pins, means for rotating said drums at substantially the same angular velocity and in the same direction, and means for progressively increasing the distance between said coacting pins as said drums rotate away from said wire guide.

2. Apparatus according to claim 1 wherein said means for rotating said drums comprises a driven shaft, housing means concentrically within said drums for rotatably supporting said shaft, means for connecting one said drum with said shaft, self-adjusting means interconnecting said drums for rotation as a unit, bearing means supporting said other of said drums in an inclined position relative to said one said drum; the pins on each said drum defining a plane which is normal to the center line of associated drum.

3. Apparatus according to claim 2 wherein said bearing means include an annular body concentric within said other drum, resilient means supporting said annular body on said housing means, and set screw means carried by said annular body and engageable with said housing means for inclining said bearing means with respect to said housing means.

4. Apparatus according to claim 3 wherein said wire guide means includes a slide member moveable in a plane parallel with the axis of said driven shaft, a wire guide nozzle, means for pivotally mounting said nozzle on said slide, and means connected with said slide and said wire guide nozzle for moving said slide and nozzle in timed relation whereby said nozzle moves in an oval path in a plane parallel with the periphery of said one drum.

5. Apparatus according to claim 4 wherein said driven shaft and said means for moving said slide and wire guide nozzle are connected with a common shaft and prime mover means for rotating said common shaft.

References Cited

UNITED STATES PATENTS

| | | |
|---|---|---|
| 1,615,666 | 1/1927 | Wright. |
| 2,636,523 | 4/1953 | Hammerschlag _____ 140—92.2 |
| 2,963,048 | 12/1960 | Smith _____ 140—71 |
| 3,298,403 | 1/1967 | Allers _____ 140—92.1 |
| 3,319,310 | 5/1967 | Woehling _____ 140—71.5 |

FOREIGN PATENTS

| | | |
|---|---|---|
| 23,260 | 7/1907 | Great Britain. |
| 791,378 | 2/1958 | Great Britain. |

CHARLES W. LANHAM, *Primary Examiner.*

E. M. COMBS, *Assistant Examiner.*